March 6, 1934. A. KINDELMANN ET AL 1,949,478
FLY WHEEL MOUNTING
Filed Feb. 28, 1931   3 Sheets-Sheet 1
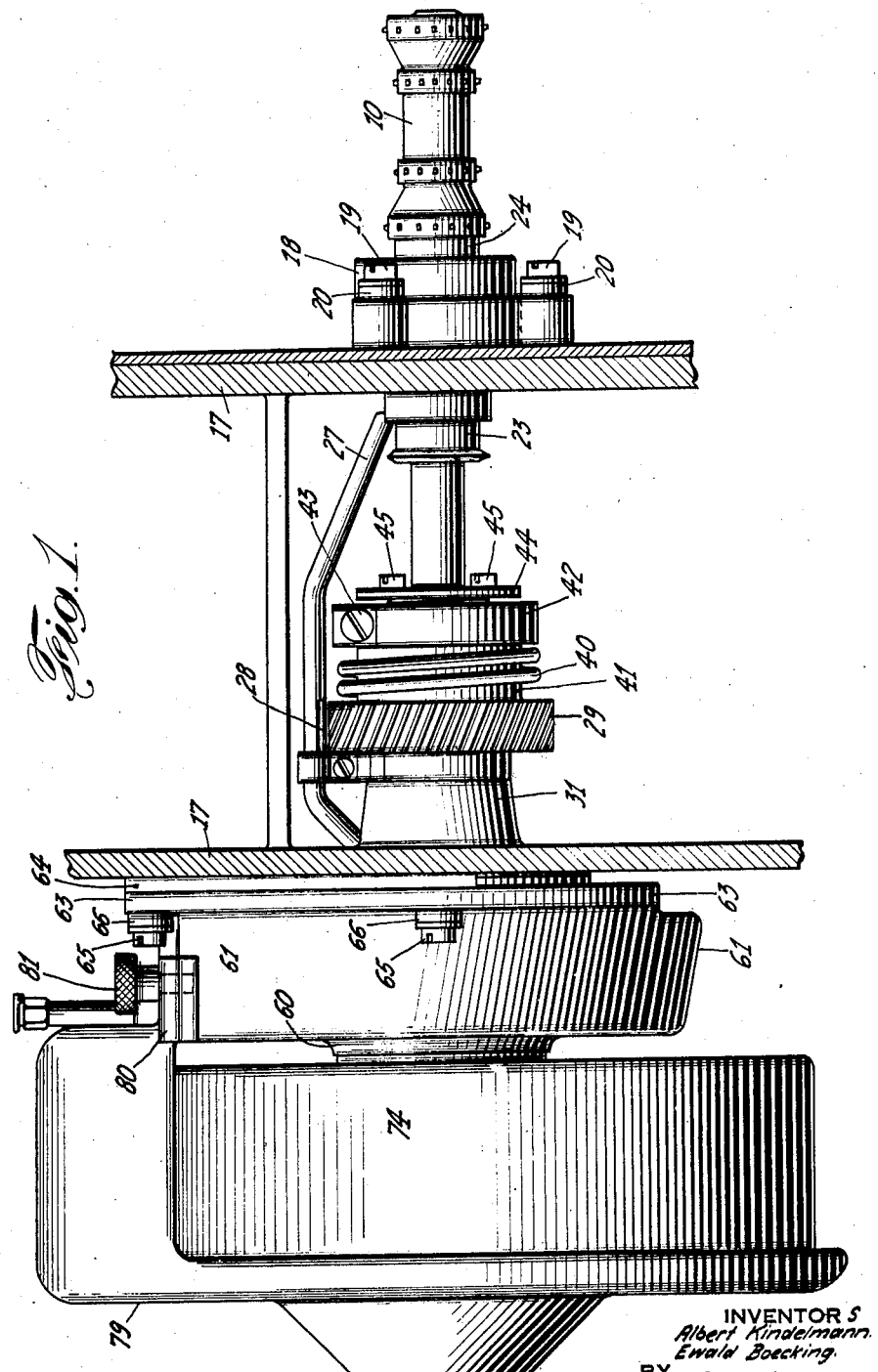
INVENTORS
Albert Kindelmann.
Ewald Boecking.
BY
ATTORNEYS

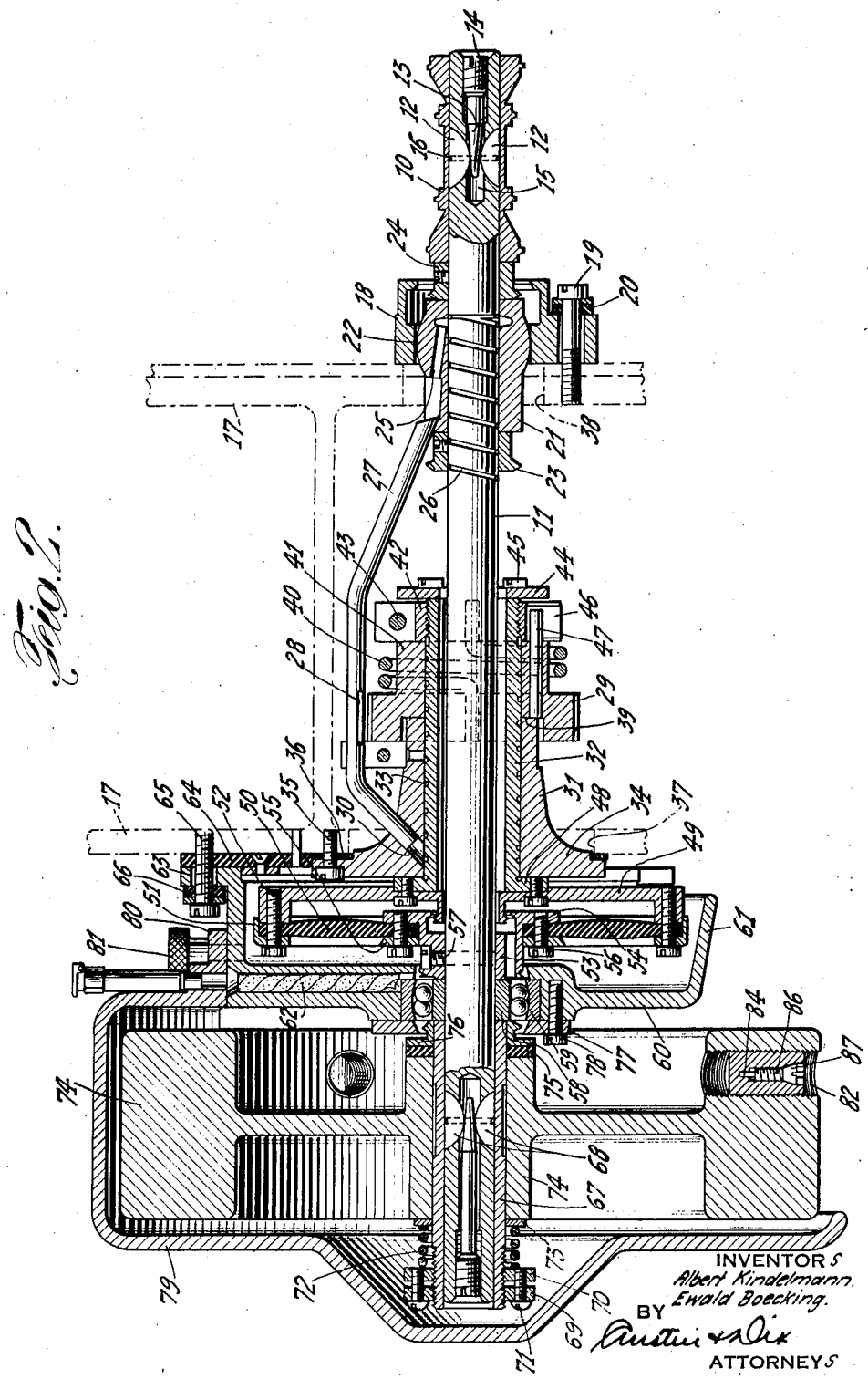

March 6, 1934.  A. KINDELMANN ET AL  1,949,478
FLY WHEEL MOUNTING
Filed Feb. 28, 1931   3 Sheets-Sheet 3
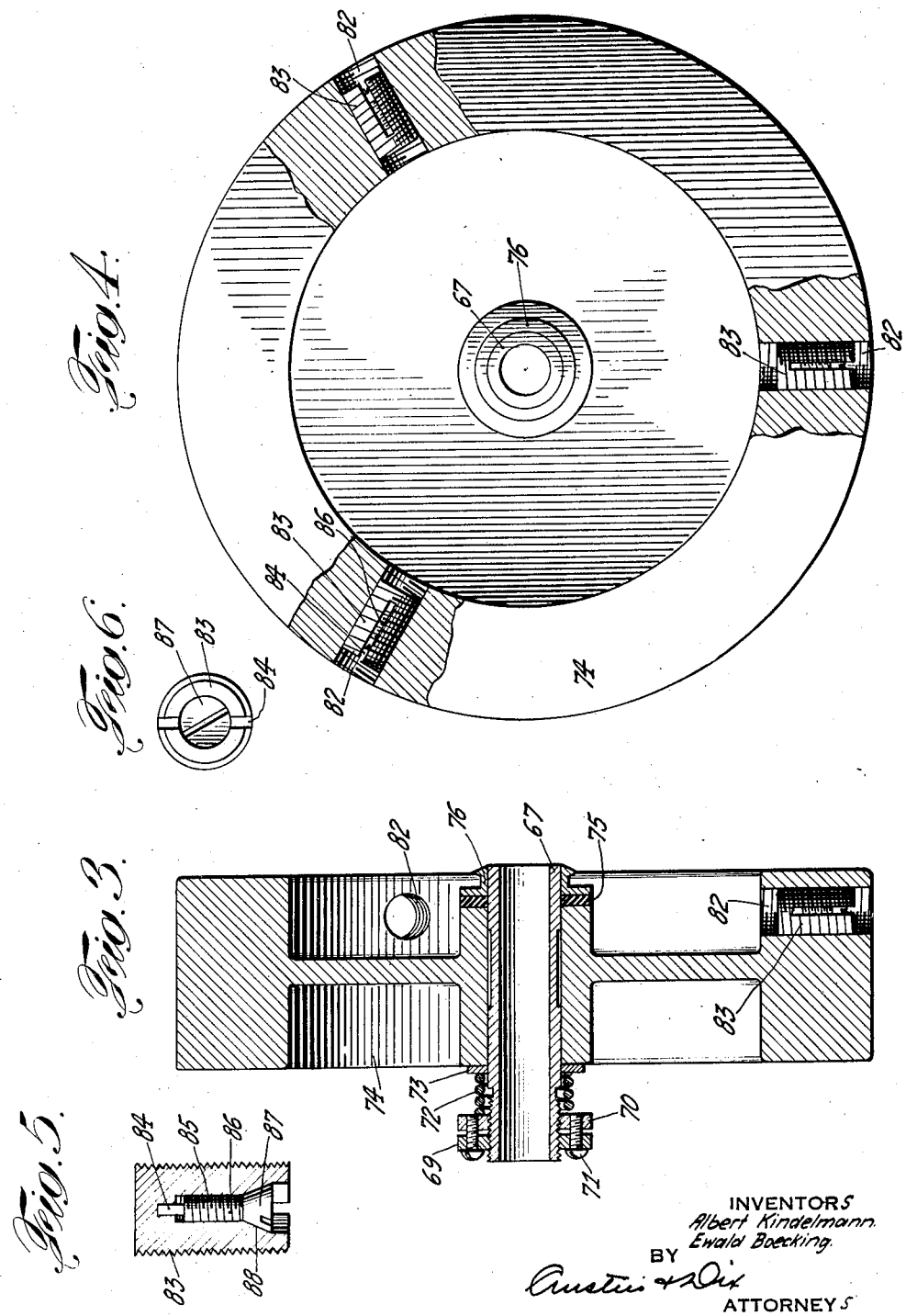
INVENTORS
Albert Kindelmann.
Ewald Boecking.
BY
Austin + Dix
ATTORNEYS Patented Mar. 6, 1934

1,949,478

UNITED STATES PATENT OFFICE 1,949,478

FLY WHEEL MOUNTING

Albert Kindelmann, Floral Park, and Ewald Boecking, Brooklyn, N. Y., assignors to International Projector Corporation, New York, N. Y., a corporation of Delaware Application February 28, 1931, Serial No. 519,084

6 Claims. (Cl. 271—2.3)

This invention relates to new and useful improvements in a support and driving means for sound sprocket shafts especially adaptable for motion picture projectors in which the film is provided with sound striata for moving past an aperture to be subjected to a light beam for the purpose of transferring the light variations into sound.

A main object of the invention is to provide a construction whereby the sound sprocket shaft is driven with absolute uniformity of speed.

A further object of the invention is to provide supporting means so constructed that the sound sprocket shaft is effectively cushioned from the frame on which it is mounted so that no vibrations are transmitted to the shaft.

A further object is to provide a construction in which the driving mechanism of the machine is likewise cushioned from the shaft which it drives so that no vibrations or undue disturbances from the other mechanism of the projector are transmitted to the sound sprocket shaft.

A still further object is to provide a simple and efficient construction whereby the parts can be readily assembled and taken apart with ease and dispatch.

Further and more specific objects, features and advantages will more clearly appear from a consideration of the specification hereinafter taken in connection with the accompanying drawings which form part of the specification and which illustrate a present preferred form of the invention.

In general contemplation the invention comprises a unitary construction which can be readily mounted on the frame of the projector and is quickly removed therefrom. This unit preferably comprises a sound sprocket shaft, a driving connection thereto which is flexible and cushioned from the shaft, a sprocket adjustably and accurately supported on the end of the shaft and a fly-wheel on the other end of the shaft connected thereto in flexible manner to permit ready over-running of the fly-wheel without disturbing the uniform motion of the shaft. The sound sprocket shaft is supported at widely spaced points by bearing members both of which are in turn supported directly or indirectly from the frame through the intermediary of cushioning members so that practically no vibrations in the frame are transmitted to the shaft.

The invention further comprises a guard casing for the driving member which is resiliently connected to and supported from the frame of the machine, this casing supporting one of the bearing members on the shaft. The fly wheel is also provided with a guard casing therearound which casing is in a simple manner connected to the guard casing in the drive member. The invention also contemplates a simple and efficient means whereby the longitudinal position of the shaft may be very quickly and easily adjusted so that the linear and planar position of the sprocket can be accurately determined with respect to a fixed point.

Further details of the invention include means in the drive mechanism itself and certain features of construction in connection with efficient alignment of the bearing members and certain rotating elements.

The invention is illustrated in the drawings, of which:

Fig. 1 is a side elevational view of the device;

Fig. 2 is a vertical longitudinal sectional view;

Fig. 3 is a vertical longitudinal sectional view through the fly wheel unit;

Fig. 4 is a front elevational view of the fly wheel with certain parts in section showing the balancing weights;

Fig. 5 is a sectional view showing one of the balancing weights; and

Fig. 6 is an inverted plan view of one of the balancing weights.

This device is especially designed to produce uniform motion for a film sprocket such as sprocket 10 which in the form shown in the drawings is the so-called sound sprocket used in talking motion picture machines to move the film past the sound aperture at an absolute uniform rate of speed. This sprocket 10 is fastened on a rotatable shaft 11, in any suitable manner and is preferably held in position by reason of the frictional engagement with the inner bore of the sprocket of a pair of key elements such as 12, the end faces of which are curved or angular and engaged by the inner bevelled end 13 of an adjusting pin, the outer end of which is threaded as at 14 in a bore 15 on the shaft 11. By adjustably threading the pin 14, the tapered end 13 of it can be moved inwardly or outwardly with respect to the key elements 12, the force of which tends to tighten them against the inner surface of the sprocket or to release them from consequential engagement therewith. The key elements of which there may be two or more having at their outer face a groove in which one coil of the spring member 16 lies. This spring member is intended normally to prevent the key member from extending beyond the surface of the shaft 11 except when positively forced therefrom by the wedge element 13. It will be seen that by unscrewing the pin 14, the pressure of the key elements on the sprocket will be released and the sprocket can be very easily drawn off the shaft.

The shaft is suitably journalled to the frame 17 of the machine which is preferably a motion picture projector. This journalling is achieved at one end of the shaft by fastening to the frame a cup-shaped casing 18, having openings at the front and rear faces thereof. This casing is fastened to the frame by means of bolts 19 passing loosely through holes in the casing and having in their heads washers 20 made of some suitable insulating and cushioning material such as rubber. Preferably the casing is also supplied with means not shown, to adjust the casing so as to clamp it on any elements enclosed thereby. Disposed and extending within the casing 18 is a bar member 21 having suitable bores through which shaft 11 passes. This bearing member has a curved outer surface 22 designed to lie rather snugly within one of the openings in the casing 18 and to be firmly gripped therein when the split casing 18 is tightened up in any suitable manner. This construction permits the bearing member 21, when the casing is loosened to be adjusted longitudinally of the shaft but at the same time allows it to be firmly fastened in position after it has been adjusted. On each side of the bearing member 21 are disposed collars such as 23 and 24 which can be suitably fastened to the shaft, by set screws. These collars will prevent longitudinal movement of the shaft 11 and the right hand collar adjacent the sprocket 10 may be employed to accurately determine a desired position of the sprocket 10 on the shaft.

The bearing member 21 is provided with an oil passage 25 extending to the inner bore thereof and this passage opens into a spiral groove 26 on the shaft 11, so that the oil from the pipe 27 will suitably lubricate the shaft 11 within the bearing member 21. This pipe 27 has a cut-away portion 28 on its underside just over a pinion 29 which is a pinion driven from any suitable portion of the driving mechanism of the machine, which in the usual practice is constantly bathed in oil. The rotation of the drive pinion will tend to throw oil in the portion 28 so that it will pass in both directions along the pipe 27. The pipe 27 at its other end is connected to a passage 30 in a bearing member 31 leading to an inner bore thereof which acts as a bearing for the sleeve 32. This sleeve 32 is preferably provided with spiral oil grooves 33.

The bearing member 31 has a flange-like portion 34 at one side thereof, and on the outer portions of this flange 34 are fastened by bolts 35 to the frame of the machine with a ring or layer of cushioning material, such as rubber 36 between the flange and the frame. The frame as will be seen from Fig. 2, is cut-away as at 37 to permit the projection therethrough of the bearing member 31 and its associated parts just as the frame is cut-away at 38 to permit the passage therethrough of the bearing 21 with its associated parts.

The bearing member 31 is provided with a shoulder 39 bearing against one face of the gear 29. This gear is loosely rotatable on the sleeve 32 and one end of a spring 40 is fastened thereto. This spring is coiled around a hub 41 of the gear and the other end of the spring is fastened to a collar 42 threadably fastened on the end of sleeve 32. This collar is a split collar adapted to be clamped by means of an adjusting pin 43 in the usual manner. A lock ring 44 is fastened by bolts 45 to the end of sleeve 32. The ring 42 is also provided with one or more slots 46 into which pins 47 are loosely projected, these pins being mounted or fixed in the hub 41 of the gear 29. As the gear 29 rotates, the combination of the spring 40 and the pins 47 will form a more or less elastic driving connection between the gear and the ring 42 causing the rotation of the sleeve 32.

The other end of the sleeve 32 has a flange 48. To this flange there is bolted a cup-shaped disk 49 which is rotated therefore, with the sleeve 32. This member 49 may be a cup-shaped disk or a spider with a plurality of arms. To the opposite face of this disk or to the opposite face of the several arms thereof, a bored plate 50 of suitable cushioning material, such for instance as rubber, is fastened by means of flange ring 51 and suitable bolts 52. Extending through the top of this cushioning or flexible drive plate 50 is a collar-like casing 53 having a flange portion 54. Between this flange portion 54 and a ring 55, the inner edge of the driving disk 50 is secured by means of bolts 56. This collar member 53 is fastened by a key bolt 57 to the shaft 11, and as the one direct driving connection of the shaft from the pinion 29 through the intermediary elements as above described.

The collar-like drive member 53 is fastened on the shaft 11 in relation to a ball bearing member having inner and outer race portions 58 and 59. This ball bearing element is disposed snugly within a bore in a guard plate 60 which has an angular flange 61 extending around the top sides and bottom of the movable driving elements comprising the spider 49 and the flexible plate 50 with their immediately associated parts. A suitable oil passage is provided in this guard member in which a wick 62 is disposed to lubricate the shaft and the ball bearing element. The guard member 60 is provided with a flange 63 around a major portion of its periphery adjacent the frame 17 and a curved annular plate 64 of rubber is disposed between this flange and the frame. The bolts 65 are fastened to the frame and extend loosely in holes in the flange and have beneath their heads washers 66 of rubber between their heads and the adjacent surface of the flange 63. In this manner the guard plate is also supported from the frame but separated therefrom at all possible points of contact by cushioning material so that vibration will not be transmitted in any manner to the shaft 11 and from it to the sprocket 10.

On the other side of the ball bearing element mounted on the guard plate 60 there is disposed a sleeve 67 snugly but rotatably disposed on shaft 11. This sleeve is consequently held to the shaft by means of friction key members such as 68 which are constructed and operated in exactly the same manner as has been described in connection with the key elements 12 at the other end of the shaft 11. Consequently the sleeve 67 can be firmly but adjustably fastened on the shaft 11, as desired. The outer end of this sleeve 67 is threaded and two locking nuts 69 and 70 are adjusted on this threaded portion, and by means of the bolts 71 jammed into position thereon. A spring 72 is loosely disposed between the inner nut 70 and a ring plate 73 loosely bearing against the hub of a fly wheel 74 which is rotatably mounted on the sleeve 67. At the other end of the hub of the flywheel the collar 75 of rubber is disposed between it and another collar of metal 76 bearing against the ball bearing unit, thus the fly wheel itself is cushioned from the ball bearing unit and the guard plate. The ball bearing unit is held in position in the plate 60 and against the collar drive member 53 by means of a ring 77 fastened to the plate 60 by means of bolts 78.

Extending around the top of the fly wheel and the upper face thereof is a guard casing 79 which has at its outer front portion a curved plate 80 fastened by bolts 81 to the top portion of the flange 61 of the guard plate 60.

The fly wheel is provided with a plurality of bores such as 82 into which are disposed balancing weight members 83 which are preferably threaded so as to be adjusted in the bores, as desired. These threaded balancing weight members are split as shown at 84, Fig. 6, and have an inner threaded bore 85 engaged by a screw 86 having a bevelled head 87 adapted to be engaged with a similar bevelled portion 88. After the weight has been screwed in far enough to create the proper balance, this screw head 87 is tightened up and tends to jam the weight in this adjusted position.

In the operation of the device it will first be noticed that the shaft 11 has two bearings, one in the element 21 and the other in the ball race element 58. Both of these elements through the intermediary of flexible rubber cushioning plates disposed between the frames at the points of connection of the apparatus to the frame are supported in a free cushioned manner so that a minimum of vibration reaches the shaft. The drive itself is flexible, being contributed to the shaft through the intermediary of the flexible disk. The shaft does not touch the frame at any point.

The connection between the pinion 29 and the sleeve 32 is fairly flexible so as not to contribute or permit too strongly any jars or vibrations therethrough. The fly wheel 74 which is perfectly balanced by means of the weights 83 consequently engages the sleeve 67, but as soon as there is any tendency of the shaft 11 to stop or slow up, the momentum of the fly wheel is not too violently transmitted to the shaft. The fly wheel in this extent has a moving relation to the shaft, because of the action of the spring 72, this is sufficient to drive the fly wheel when the motion is uniform but permits it to move of itself when the motion tends to be non-uniform.

This device is simple to assemble and disassemble from the machine. To remove the fly wheel from the shaft it is merely necessary to remove the bolts 81 whereupon the guard casing 79 is easily taken off. The key elements 68 are loosened by unscrewing their adjusting pins so that the friction of the sleeve 67 is removed whereupon the fly wheel with the sleeve 67 can be slipped off the end of the shaft.

To remove the whole device from the frame it is merely necessary to unscrew the bolts 65 and 35 and release the clamping action of the casing 18 whereupon the entire drive and control unit for the sprocket 10, including the sprocket can be withdrawn as a unit. The openings 37 and 38 of the frame are of ample dimension to permit this.

The sprocket 10 can be very accurately adjusted with respect to the position which it is to occupy with regard to the film and the sound aperture. This position having been determined the right hand collar 24 can be moved on the shaft and fixed in a position predetermined, and then the casing 18 clamped to bearing member 21 can be moved until it engages its collar whereupon the casing can be easily and quickly adjusted on the frame. The left hand collar can then be attached on the frame at the left hand side of bearing member 21. These parts having been fixed it is a simple matter to unscrew the pin shaft 14 to permit them to be slipped over the end of the shaft. When the sprocket is put back of the shaft it is absolutely certain that it will be in the right position after it is shoved up firmly against the collar 24.

It will therefore be obvious that this device is simple, compact, rugged and capable of being firmly aligned. It can be quickly and easily assembled and disassembled. The portions to attach the fly wheel and the shaft are cushioned from each other and from the frame. The shaft is flexibly cushioned from the driving mechanism so that at no point of connection is there a metal-to-metal contact between the frame and the driving mechanism or the driving mechanism, and thus the shaft will not transmit vibration to the sprocket 10. This is a highly important reason for the sprocket 10 must move with absolute uniformity of speed in order that it will not affect the clarity of the sound being produced particularly in sound film where the sound striata are disposed on the film and where the pitch of the tone will vary if the speed is not uniform.

While the invention has been described in detail and with respect to a present preferred form thereof it is not to be limited to such details and forms since many changes and modifications may be made in the invention without departing from the spirit and scope of the invention in is broadest aspects. Hence it is desired to cover any and all forms and modifications of the invention which may come within the language or scope of any one or more of the appended claims.

What is claimed, is:

1. In a motion picture projector, a sound sprocket shaft, bearing means along said shaft at widely spaced points, means for supporting said shaft from the frame at widely spaced points, means for cushioning said supporting means from the frame, a driving mechanism supported from the frame, means for cushioning the support of the driving mechanism from the frame, a flexible connection between the driving mechanism and the shaft, a fly-wheel on said shaft and a flexible frictional connection between the fly-wheel and the shaft.

2. In a motion picture projector, a sound sprocket shaft, a bearing member therefor, a casing in which said bearing member is housed, means for supporting said casing from the frame of the machine, and cushioning means disposed between the casing and the frame, adjustable collars on the shaft on each side of the bearing member to permit the adjustment of the bearing member along the shaft.

3. In a motion picture projector, a sound sprocket unit having oil grooves therein, a bearing member in said unit adjacent said oil grooves, said member having an oil passage, a driving pinion, an oil pipe disposed adjacent the pinion and having one end connected to the oil passage in the bearing member, said pipe having an opening therein adjacent the pinion to receive oil thrown off by the pinion to be transferred to said oil passages.

4. In a motion picture projector, a sound sprocket shaft, means for supporting said shaft at spaced points from the frame, means for cushioning the supporting means from the frame to prevent transmission of vibrations to the shaft, a bearing member supported and cushioned from said frame, a sleeve rotatable within said bearing member, a driving pinion rotatable on said sleeve, a flexible connection between said pinion and said sleeve, and a flexible connection of cushioning material between the sleeve and the shaft.

5. In a motion picture projector, a sound sprocket shaft, a sleeve surrounding said shaft but spaced therefrom, a bearing member in which said sleeve is rotatable, a layer of cushioning material between said bearing member and the frame of the machine, a drive pinion rotatable on said sleeve, a flexible connection between the pinion and the sleeve, a spider on one end of said sleeve, a collar on the shaft and a connection between said spider and said collar formed of flexible cushioning material.

6. In a motion picture projector, a sound sprocket shaft, a driving mechanism disposed around said shaft but separate therefrom, means for supporting the driving mechanism from the frame of the machine, cushioning means disposed between the supporting means and the frame, a flexible cushioning connection between the driving means and the shaft, a guard casing for part of said drive mechanism, said casing supported from the frame, cushioning means disposed between the frame and casing, a fly-wheel rotatable on the end of the shaft, a flexible frictional connection between the shaft and the fly-wheel, a guard casing around the fly-wheel, said fly-wheel guard casing adjustably supported from the previously mentioned guard casing.

ALBERT KINDELMANN.
EWALD BOECKING.